US009056628B2

(12) United States Patent
Russell et al.

(10) Patent No.: US 9,056,628 B2
(45) Date of Patent: Jun. 16, 2015

(54) STEERING COLUMN ROLL STRAP

(71) Applicant: Steering Solutions IP Holding Corporation, Saginaw, MI (US)

(72) Inventors: James C. Russell, Fairgrove, MI (US); Matthew J. T. Vincent, Saginaw, MI (US); Robert W. Dubay, Saginaw, MI (US); Donald A. Buzzard, Saginaw, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 14/201,177

(22) Filed: Mar. 7, 2014

(65) Prior Publication Data
US 2014/0251059 A1    Sep. 11, 2014

Related U.S. Application Data

(60) Provisional application No. 61/774,890, filed on Mar. 8, 2013.

(51) Int. Cl.
*B62D 1/19*    (2006.01)
(52) U.S. Cl.
CPC ........... *B62D 1/195* (2013.01); *Y10T 29/49826* (2015.01)
(58) Field of Classification Search
CPC ...................................................... F16F 7/123
USPC ................... 280/777; 74/492, 493, 527, 531
See application file for complete search history.

(56) References Cited

U.S. PATENT DOCUMENTS

| 4,951,522 | A | * | 8/1990 | Chowdhury et al. | 74/492 |
|---|---|---|---|---|---|
| 4,989,898 | A | * | 2/1991 | Yamaguchi et al. | 280/777 |
| 5,230,533 | A | * | 7/1993 | Yamaguchi | 280/775 |
| 5,738,377 | A | * | 4/1998 | Sugiki et al. | 280/777 |
| 5,961,146 | A | * | 10/1999 | Matsumoto et al. | 280/777 |
| 6,322,103 | B1 | * | 11/2001 | Li et al. | 280/777 |
| 6,454,302 | B1 | * | 9/2002 | Li et al. | 280/777 |
| 6,655,716 | B2 | * | 12/2003 | Riefe | 280/777 |
| 6,802,536 | B2 | * | 10/2004 | Li et al. | 280/777 |
| 7,434,840 | B2 | * | 10/2008 | Manwaring et al. | 280/777 |
| 7,490,855 | B2 | * | 2/2009 | Inayoshi et al. | 280/777 |
| 2003/0042723 | A1 | * | 3/2003 | Riefe | 280/777 |
| 2004/0100084 | A1 | * | 5/2004 | Munro et al. | 280/777 |
| 2004/0232685 | A1 | * | 11/2004 | Gatti et al. | 280/777 |
| 2005/0076735 | A1 | * | 4/2005 | Li et al. | 74/492 |
| 2006/0033320 | A1 | * | 2/2006 | Finkbeiner et al. | 280/777 |
| 2007/0194563 | A1 | * | 8/2007 | Menjak et al. | 280/777 |
| 2007/0228716 | A1 | * | 10/2007 | Menjak et al. | 280/777 |
| 2008/0023952 | A1 | * | 1/2008 | Manwaring et al. | 280/777 |

* cited by examiner

*Primary Examiner* — Paul N Dickson
*Assistant Examiner* — Darlene P Condra
(74) *Attorney, Agent, or Firm* — Cantor Colburn LLP

(57) ABSTRACT

In an exemplary embodiment of the invention, an energy absorbing device for a steering column assembly is provided. The device includes a first end configured to couple to a first component of the steering column assembly, a second end configured to couple to a second component of the steering column, and an intermediate portion extending between the first and second ends. The intermediate portion includes a curved portion having a radius, and an aperture extending through the intermediate portion. The aperture is configured to shift a collapse characteristic of the energy absorbing device and to facilitate maintaining the radius constant when a force moves the first end relative to the second end and deforms the energy absorbing device.

16 Claims, 4 Drawing Sheets

STEERING COLUMN ROLL STRAP

CROSS-REFERENCES TO RELATED APPLICATIONS

This patent application claims priority to U.S. Provisional Patent Application Ser. No. 61/774,890, filed Mar. 8, 2013, which is incorporated herein by reference in its entirety.

FIELD OF THE INVENTION

The following description relates to energy absorbing devices, and more particularly, to energy absorbing straps for a steering column assembly.

BACKGROUND OF THE INVENTION

Roll strap devices have been used as a means to absorb energy during the collapse of a steering column. Typically, roll straps absorb energy during the deformation of the strap in crash event. For example, a vehicle operator may contact the steering column assembly, whereby kinetic energy of the occupants may be dissipated through compression of the steering column assembly. However, it may be advantageous to improve control of the collapse characteristics of some known roll strap devices.

Accordingly, it is desirable to provide systems and methods for controlling or tuning the characteristics of a roll strap to provide a desired kinetic energy dissipation of vehicle occupants in the event of contact between a vehicle occupant and a steering column assembly.

SUMMARY OF THE INVENTION

In an exemplary embodiment of the invention, an energy absorbing device for a steering column assembly is provided. The device includes a first end configured to couple to a first component of the steering column assembly, a second end configured to couple to a second component of the steering column, and an intermediate portion extending between the first and second ends. The intermediate portion includes a curved portion having a radius, and an aperture extending through the intermediate portion. The aperture is configured to shift a collapse characteristic of the energy absorbing device and to facilitate maintaining the radius constant when a force moves the first end relative to the second end and deforms the energy absorbing device.

In another exemplary embodiment of the invention, a steering column assembly is provided. The assembly includes a mounting bracket, a first jacket coupled to the mounting bracket and having a longitudinal axis, and a second jacket slidably disposed with the first jacket for telescoping movement along the longitudinal axis relative to the first jacket. The assembly further includes an energy absorbing strap having a first end coupled to the second jacket, a second end coupled to one of the first jacket and the mounting bracket, and an intermediate portion extending between the first and second ends. The intermediate portion includes a curved portion having a radius, and an aperture extending through the intermediate portion. The aperture is configured to shift a collapse characteristic of the energy absorbing device and to facilitate maintaining the radius constant when a force moves the first end relative to the second end and deforms the energy absorbing device.

In yet another exemplary embodiment of the invention, a method of fabricating an energy absorbing device for a steering column assembly is provided. The method includes providing a strap having a first end configured to couple to a first component of the steering column, a second end configured to couple to a second component of the steering column, and an intermediate portion extending between the first and second ends, where the intermediate portion includes a curved portion having a radius. The method further includes forming an aperture through the intermediate portion, the aperture configured to shift an initial collapse characteristic of the energy absorbing device and to facilitate maintaining the radius constant when a force acting on the steering column first component moves the first end relative to the second end and deforms the energy absorbing device.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
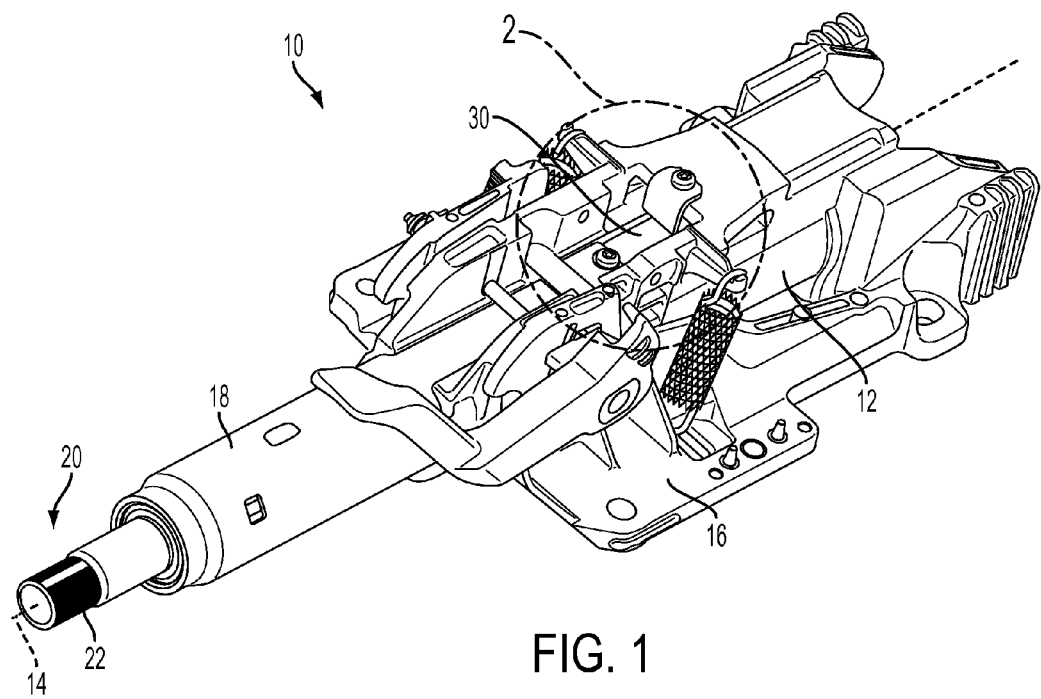
FIG. 1 is a perspective view of a steering column assembly having an energy absorbing roll strap in accordance with an exemplary embodiment of the invention.
Figure 2:
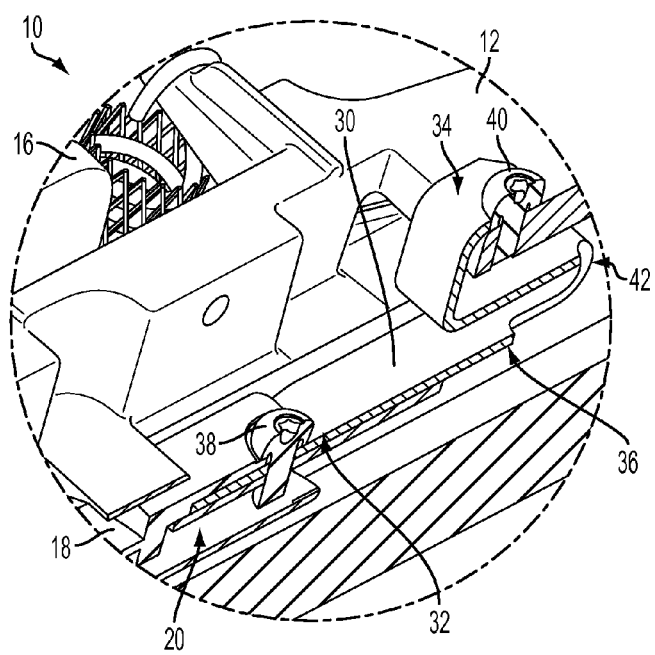
FIG. 2 is an enlarged view of the steering column assembly and roll strap shown in FIG. 1 and taken on section 2.

Referring now to the Figures, where the invention will be described with reference to specific embodiments, without limiting same, FIGS. 1 and 2 show an exemplary steering column assembly 10 that includes a lower jacket 12 disposed along a longitudinal axis 14 and pivotally coupled to a mounting bracket 16, which is coupled to a host structure of a vehicle (not shown). An upper jacket 18 is arranged co-axially with lower jacket 12 and longitudinal axis 14 and is configured to translate along axis 14 relative to lower jacket 12, thereby facilitating telescoping and/or collapse motion of steering column assembly 10. A rotating inner shaft 20 is disposed co-axially within jackets 12, 18 and includes a steering wheel end 22 configured to receive a vehicle steering wheel (not shown).

Figure 3:
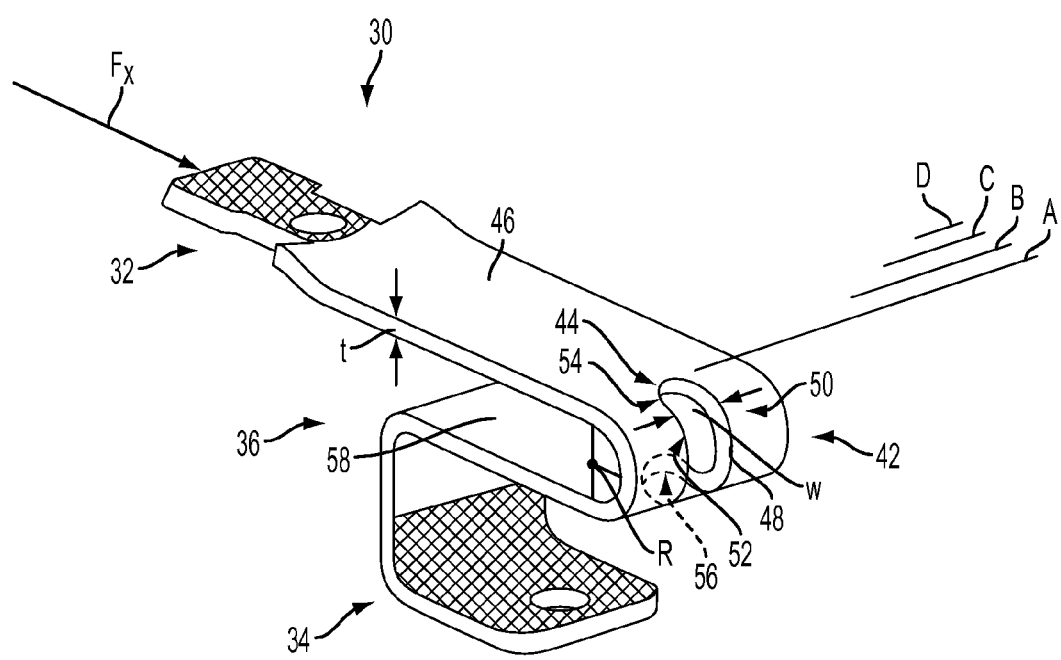
FIG. 3 is a perspective view of the roll strap shown in FIGS. 1 and 2.

With further reference to FIG. 3, steering column assembly 10 includes an energy absorbing roll strap 30 that is coupled between lower jacket 12 and upper jacket 18. During a collapse event (e.g., a vehicle crash), a force 'Fx' may move or collapse upper jacket 18 along axis 14 relative to fixed mounting bracket 16, and energy absorbing strap 30 dissipates at least some of the kinetic energy of collapsing upper jacket 18.

In the exemplary embodiment, energy absorbing strap 30 includes a first end 32, a second end 34, and an intermediate portion 36 extending therebetween. First end 32 is coupled to upper jacket 18 by a fastener 38, and second end 34 is coupled to lower jacket 12 by a fastener 40. Alternatively, first and second ends 32, 34 may be coupled to their respective steering column components using any suitable method that enables assembly 10 to function as described herein. For example, first and second ends 32, 34 may be welded to upper jacket 18 and mounting bracket 16, respectively.

Strap intermediate portion 36 includes a curved portion 42 having a radius 'R'. Curved portion 42 facilitates "rolling" of strap 30 during a collapse event as first end 32 moves in the direction of force 'Fx'. An initial collapse or roll area 44 is located at the transition between curved portion 42 and a flat portion 46 of intermediate portion 36. Initial collapse area 44 represents the starting roll or deformation location where the "roll" or deformation of strap 30 begins during a collapse event.

In the exemplary embodiment, energy absorbing strap 30 includes an inner wall 48 defining an aperture 50 that extends through intermediate portion 36. Aperture 50 facilitates controlling or tuning initial collapse characteristics of energy absorbing strap 30. In the embodiment shown in FIG. 3, aperture 50 is a slot 52 extending through curved portion 42 and includes a first end 54 and a second end 56. Although illustrated as having a slot shape, aperture 50 may have any suitable shape or cross-section that enables strap 30 to function as described herein. For example, aperture 50 may have a round cross-section or slot 52 may be tapered from first end 54 to second end 56. Additionally, although strap 30 is illustrated with a single aperture 50 to tune collapse characteristics, strap 30 may have any number of apertures 50 formed in strap intermediate section 36 to provide strap 30 with desired collapse characteristics. Accordingly, various increments/shapes of roll strap material can be removed from intermediate portion 36 to influence the load profile of energy absorbing strap 30.

Figure 4:
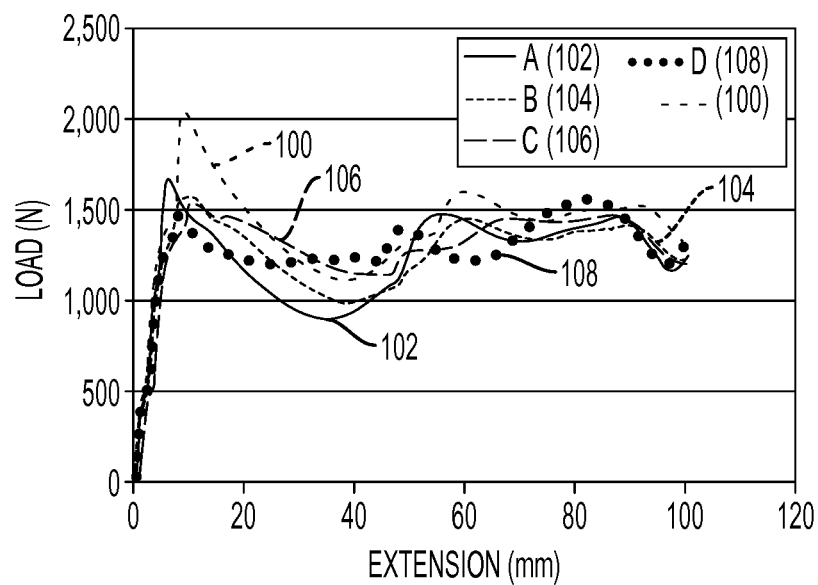
FIGS. 4 and 5 illustrate performance of exemplary embodiments of a roll strap in accordance with the invention.
Figure 5:
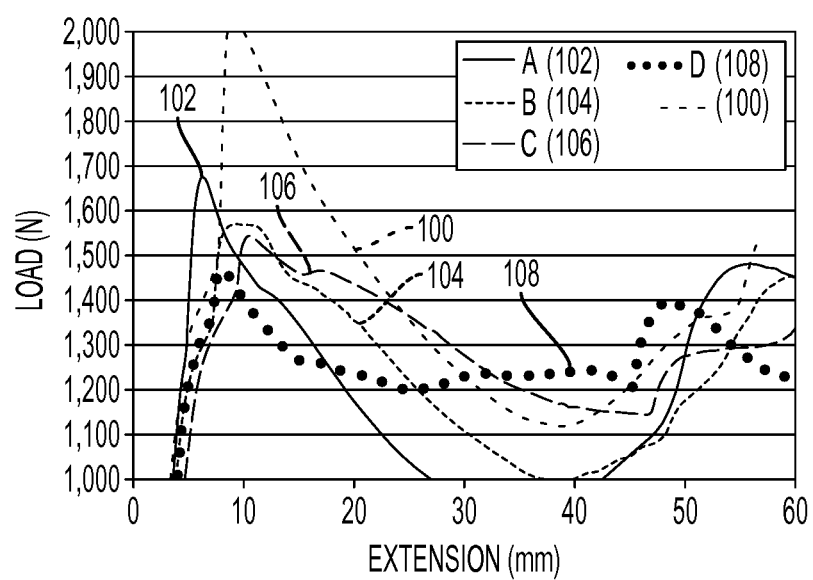

Slot first end 54 is located at or in proximity to starting roll location 44 and, as illustrated in FIG. 3, slot 52 extends along curved portion 42 to slot second end 56, which is located at the transition between curved portion 42 and a flat portion 58 of intermediate portion 36. The arrangement of slot 52 on strap intermediate portion 36 shifts or tunes the initial collapse characteristics of energy absorbing strap 30, which includes the position of the initial collapse load peak, magnitude of the initial peak, and amount of drop in load following the peak. For example, the position and length of slot 52 may be used to reduce the starting collapse load and/or reduce the drop in load typically experienced in the early portion of the collapse curve. For example, as illustrated in FIGS. 4 and 5, exemplary graphs plots collapse load of energy absorbing strap 30 vs. movement of strap first end 32 in the direction of longitudinal axis 14.

The collapse characteristics of strap 30 are further influenced or tuned by the position of slot first end 54 in relation to starting roll location 44. With further reference to FIG. 3, slot first end 54 extends to a first location 'A' to provide a first desired load profile or curve 102 compared to a load curve 100 of a baseline strap without a slot (see FIGS. 4 and 5). Extending slot first end 54 towards strap first end 32 to a second location 'B' results in a second load curve 104, extending slot first end 54 to a third location 'C' results in a third load curve 106, and extending slot first end 54 to a fourth location 'D' results in a fourth load curve 108.

Additionally, the collapse characteristics of strap 30 can be tuned or adjusted by varying other attributes of aperture 50 and strap 30. For example, a slot width 'w' 52 may be increased or decreased to respectively drop or raise the load required to initiate collapse, a thickness 't' of strap 30 may be increased or decreased to respectively raise or drop the load required to initiate collapse, and/or radius 'R' may be increased or decreased to respectively drop or raise the load required to initiate collapse.

Accordingly, the load profile of strap 30 is influenced by direct variation of parameters of strap 30, and the amount of roll radius expansion is influenced after the start of collapse movement at least in part by the rigidity between applied force 'Fx' and the position of roll radius 'R' (i.e., how the strap is secured to jackets 12, 18).

In the exemplary embodiment, when a force acts upon steering column assembly 10 (e.g., an occupant impacting the steering wheel), particularly along longitudinal axis 14, upper jacket 18 is pushed toward lower jacket 12. Because strap second end 56 is coupled to a fixed component of assembly 10 or the vehicle (e.g., lower jacket 12), as upper jacket 18 is forced toward lower jacket 12, strap second end 56 is held in place while energy absorbing strap 30 is rolled in the direction of force 'Fx'. As energy absorbing strap 30 rolls, roll radius 'R' is repositioned along strap 30 and energy is absorbed by the deformation of energy absorbing strap 30. As such, upper jacket 18 at least partially collapses onto lower jacket 12, thereby dissipating the kinetic energy of an occupant or object colliding with steering column assembly 10.

Figure 6:
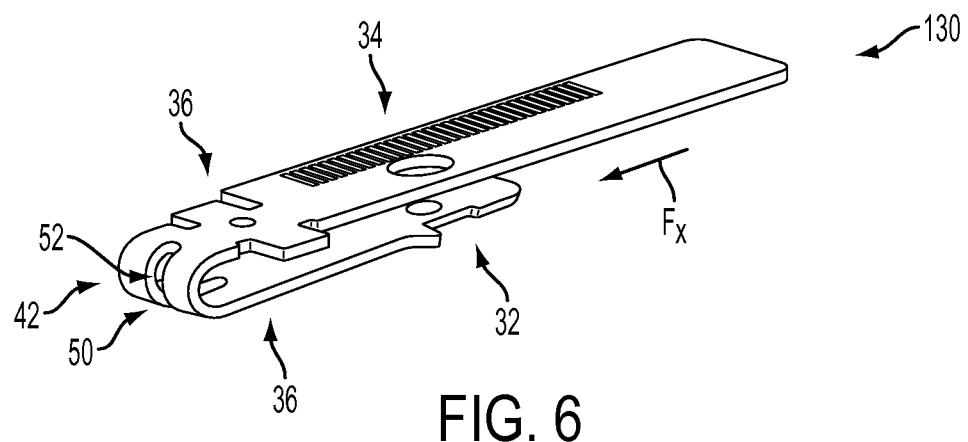
FIG. 6 illustrates another exemplary embodiment a roll strap in accordance with the invention.
Figure 7:
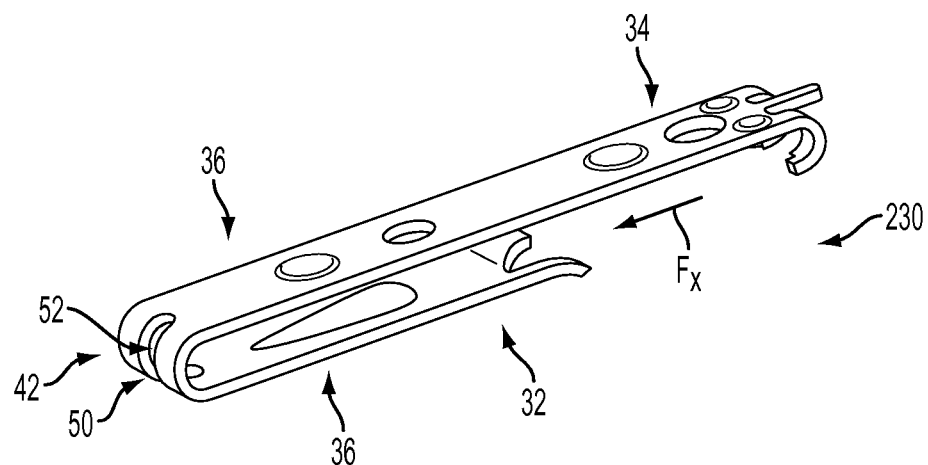
FIG. 7 illustrates yet another exemplary embodiment of a roll strap in accordance with the invention.

FIG. 3 illustrates roll strap 30 as generally S-shaped such that strap first end 32 and flat portion 46 are coplanar, and flat portion 58 is substantially parallel to flat portion 46 and strap second end 34. However, the shape of roll strap 30 may be modified to fit various applications. For example, FIG. 6 illustrates another exemplary energy absorbing strap 130 that is similar to strap 30, but is designed for use in a rake and telescope steering column assembly (not shown). In this embodiment, strap first end 32 may be coupled to jacket 18 movable in a collapse event and strap second end 34 may be coupled to stationary, lower jacket 12 via a suitable engagement mechanism (not shown). Strap first and second ends 32, 34 may be oriented substantially parallel to each other. FIG. 7 illustrates another exemplary energy absorbing strap 230 that is similar to strap 30, but is designed for use in both a rake and a rake and telescope steering column assembly (not shown), depending on the column architecture. In this embodiment, strap first end 32 may be coupled to a break-away mounting bracket (not shown) and strap second end 34 may be coupled to a vehicle stationary structure (not shown).

While energy absorbing straps 30, 130, and 230 are described coupled to specific components of a steering column assembly, it should be noted that an energy absorbing strap according to the present invention can have various configurations and will function as described herein when one strap end is coupled to a fixed portion of a vehicle/column (e.g., a vehicle cross-car beam) and the other strap end is coupled to a steering column component that moves during a collapse event (e.g., an upper jacket).

Systems and methods to control and tune collapse characteristics of energy absorbing straps are described herein. By removing strap material to form an aperture in proximity of the starting roll position, the strap energy absorbing load profile can be purposefully influenced. Various aperture cross-sectional geometries and strap attachment configurations can be implemented between the applied force 'Fx' and the roll radius 'R'. Benefits of these exemplary embodiments of the invention include increased flexibility in the energy absorbing load curve control for roll strap designs, and simplicity of production tooling.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An S-shaped energy absorbing device for a steering column assembly, said device comprising:
   a first end configured to couple to a first component of the steering column assembly;
   a second end configured to couple to a second component of the steering column;
   an intermediate portion disposed between said first and second ends;
   a first connecting portion coupled between said first end and said intermediate portion, said first connecting portion being curved and having a radius;
   an aperture extending through said curved first connecting portion, said aperture configured to shift a collapse characteristic of said energy absorbing device and to facilitate maintaining said radius constant when a force pushes said first end relative to said second end and deforms said energy absorbing device; and
   a second connecting portion coupled between said second end and said intermediate portion, wherein said second connecting portion is coupled to a first end of said intermediate portion opposite a second end of said intermediate portion that is coupled to said first connecting portion.

2. The device of claim 1, wherein said aperture extends only through said curved first connecting portion of said S-shaped energy absorbing device.

3. The device of claim 1, wherein said aperture is a slot extending longitudinally along a central portion of said S-shaped energy absorbing device.

4. The device of claim 3, wherein said slot is tapered.

5. The device of claim 1, wherein said first end and said second end extend substantially parallel to each other.

6. The device of claim 5, wherein said intermediate portion extends substantially parallel to said first and second ends, and said second connecting portion extends substantially orthogonal to said intermediate portion and said first and second ends.

7. The device of claim 1, wherein said energy absorbing device is a metallic strap.

8. The device of claim 1, wherein said energy absorbing device is a metallic strap.

9. A steering column assembly comprising:
   a mounting bracket;
   a first jacket coupled to said mounting bracket and having a longitudinal axis;
   a second jacket slidably disposed with said first jacket for telescoping movement along said longitudinal axis relative to said first jacket; and
   an energy absorbing strap comprising:
      a first end coupled to said second jacket;
      a second end coupled to one of said first jacket and said mounting bracket;
      an intermediate portion disposed between said first and second ends;
      a first connecting portion coupled between said first end and said intermediate portion, said first connecting portion being curved and having a radius;
      an aperture extending through said curved first connecting portion, said aperture configured to shift a collapse characteristic of said energy absorbing device and to facilitate maintaining said radius constant when a force pushes said first end relative to said second end and deforms said energy absorbing device; and
      a second connecting portion coupled between said second end and said intermediate portion,
      wherein said first end and said intermediate portion extend from said first connecting portion in a first direction, and said second end extends from said second connecting portion in a second direction opposite said first direction.

10. The assembly of claim 9, wherein said aperture extends only through said curved first connecting portion.

11. The device of claim 9, wherein said aperture is a slot extending longitudinally along a central portion of said energy absorbing device.

12. The device of claim 9, wherein said first end and said second end extend substantially parallel to each other.

13. The device of claim 12, wherein at least a portion of said intermediate portion extends substantially parallel to said first and second ends.

14. The device of claim 12, wherein said intermediate portion extends substantially parallel to said first end and said second end, and said second connecting portion extends substantially orthogonal to said intermediate portion and said first and second ends.

15. A method of fabricating an S-shaped energy absorbing device for a steering column assembly, the method comprising:
   providing a strap having a first end configured to couple to a first component of the steering column, a second end configured to couple to a second component of the steering column, an intermediate portion extending between the first and second ends, a curved first connecting portion coupled between the first end and the intermediate portion and having a radius, and a second connecting portion coupled between the second end and the intermediate portion; and
   forming an aperture only through the curved first connecting portion of the S-shaped energy absorbing device, the aperture configured to shift an initial collapse characteristic of the energy absorbing device and to facilitate maintaining the radius constant when a force acting on the steering column first component pushes the first end relative to the second end and deforms the energy absorbing device.

16. The method of claim 15, wherein said step of forming an aperture through the intermediate portion further comprises forming the aperture as a longitudinally extending slot.

* * * * *